United States Patent [19]

Smart, IV et al.

[11] 3,709,363
[45] Jan. 9, 1973

[54] EXTENDED AERATION, ACTIVATED SLUDGE PLANT

[75] Inventors: David O. Smart, IV, Overland Park; Grover B. Pennington, Kansas City, both of Kans.; Richard M. Plettner, Des Moines, Iowa; Robert F. Maughan, Kansas City, Mo.

[73] Assignee: BiO₂ Systems, Inc., Kansas City, Mo.

[22] Filed: Oct. 19, 1970

[21] Appl. No.: 81,780

[52] U.S. Cl. ................210/195, 210/197, 210/220, 210/525
[51] Int. Cl. ...........................B01d 21/24, C02c 1/08
[58] Field of Search.............................210/3–5, 13, 14, 210/195, 197, 220, 221, 525, 538, 540

[56]  References Cited

UNITED STATES PATENTS

| | | | |
|---|---|---|---|
| 2,987,186 | 6/1961 | Burgoon et al. | 210/220 X |
| 3,053,390 | 9/1962 | Wood | 210/195 |
| 3,234,880 | 2/1966 | Hampton | 210/195 X |
| 3,206,032 | 9/1965 | Nottingham et al. | 210/221 X |
| 1,655,191 | 1/1928 | Linnmann | 210/538 X |
| 3,087,710 | 4/1963 | Dujardin | 210/525 X |
| 3,526,591 | 9/1970 | Hampton | 210/525 |
| 3,228,526 | 1/1966 | Ciabattari et al. | 210/195 X |
| 3,537,583 | 11/1970 | Wahner | 210/4 X |

Primary Examiner—Samih N. Zaharna
Assistant Examiner—Thomas G. Wyse
Attorney—Scofield, Kokjer, Scofield & Lowe

[57]   ABSTRACT

Sewage plant apparatus and an improved, activated sludge process. The sewage plant generally comprises an aerator into which sewage is fed and is vigorously circulated and aerated by compressed air and, a clarifier from which treated liquid is discharged through an effluent line fitted with a collar and scum baffle. Tubular conduits permit mixture flow from the aerator to the clarifier. Both a skimmer and a sludge return, through which flow is induced by compressed air, recycle mixture from the clarifier back to the aerator. The skimmer is equipped with cleaning, defoaming and flow circulation devices. The improved activated sludge process includes recycling at a daily rate of 2,000 to 5,000 percent based on the volume of the aerator.

5 Claims, 4 Drawing Figures

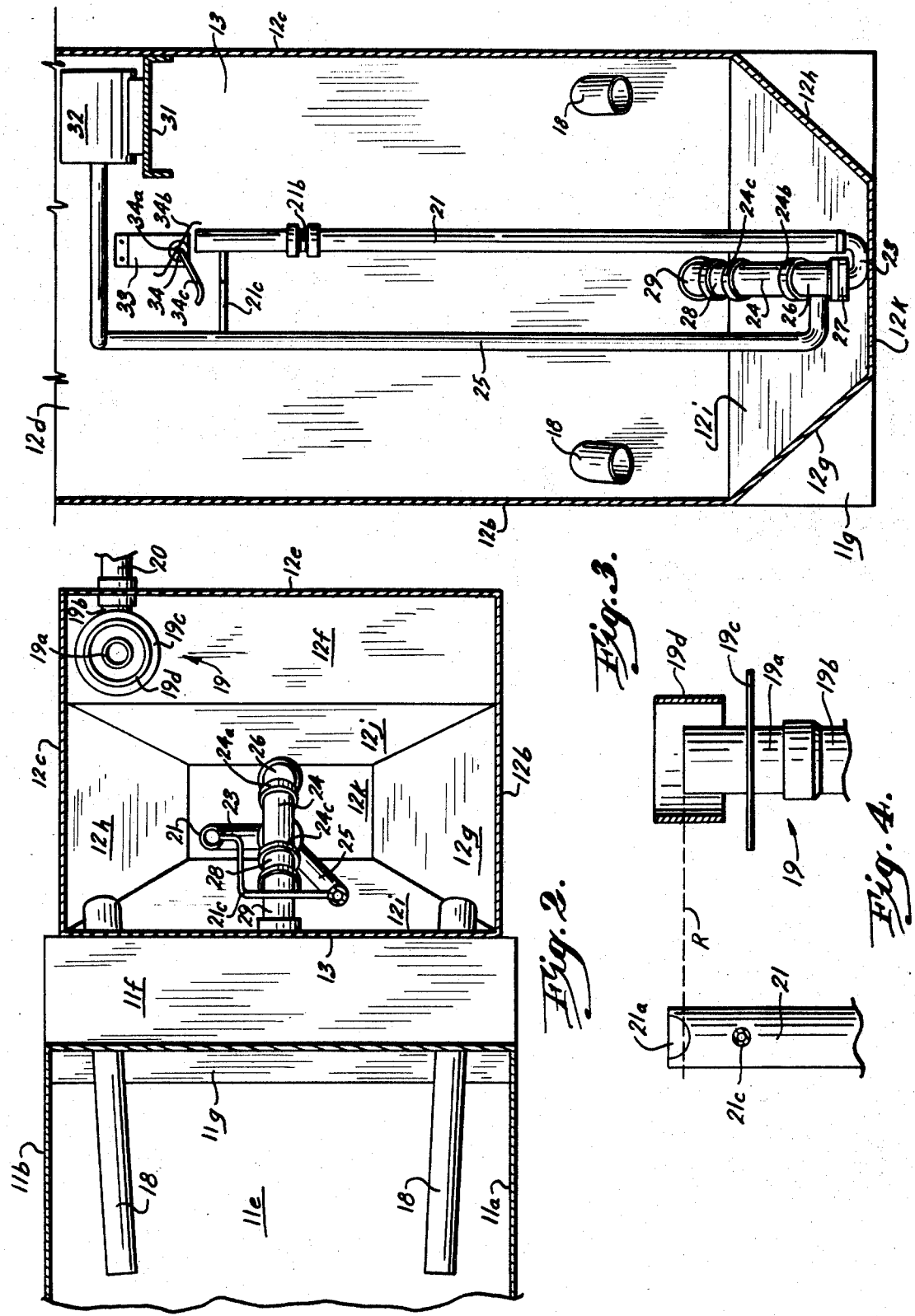

EXTENDED AERATION, ACTIVATED SLUDGE PLANT

BACKGROUND AND SUMMARY OF THE INVENTION

There is increasing public demand for the elimination of environmental pollution. With the efforts of industry (one of the major contributors to environmental pollution) being focused upon its own large scale problems, perhaps too little emphasis is placed on the single family's immediate contribution to pollution. Certainly there are many possible sources of contaminants at the individual level, and this invention deals with the elimination of one such source.

With the increasing trend toward suburban and rural living, sewage disposal must be counted as a contributor to all forms of pollution. In these areas where community sewer systems are not available, raw sewage from a residence is typically fed to a septic tank or cesspool in which wastes are only partially decomposed through the process of anaerobic digestion. During this process, noxious and offensive gases are formed which, when released to the atmosphere, cumulatively add to the level of air pollution. Likewise, the solids and liquids discharged from a septic tank or cesspool, usually through laterals, represent contaminants to the soil and to ground water.

In the field of sanitary engineering dealing with the waste treatment industry, it is known that the effect of sewage disposal on air, soil and water pollution can be greatly reduced by the process of aerobic digestion, one form of which is commonly known as the activated sludge process. This process employs an aerator zone into which raw sewage is fed and continuously circulated. Air, delivered to and dispersed through the sludge in the aerator zone, provides the life-sustaining oxygen for aerobic micro-organisms that convert the organic wastes into the end products of oxidation: carbon dioxide and water. A portion of the mixture within the aerator is continuously fed to a settling or clarifier zone in which the solid materials tend to settle to the bottom. The sludge in the bottom of the clarifier is recycled to the aerator. Treated liquid, withdrawn near the top of the clarifier, is discharged to appropriate disposal facilities. The clarifier in some treatment plants of this character is also equipped with a skimmer which returns floatable solids to the aerator.

Although the activated sludge process is very effective in decomposing organic wastes and minimizing environmental pollution, with it are associated myriad operational problems. Because of these operational drawbacks, the process has been used in large scale operations for municipalities, sub-divisions, motels and the like, but has not been successfully adapted for small scale sewage treatment for the individual residence, small office, mobile home, service station and the like.

One obstacle in the adaptation of a treatment plant of this genre is power consumption. A motor powered agitator is sometimes used to agitate and circulate the mixture within the aerator. A pump is necessary to return the sludge from the bottom of the clarifier to the aerator. Likewise, if a skimmer is employed, a pump may be needed to return this material back to the aerator. An air compressor is required to deliver sufficient quantities of air to the aerator in order to supply oxygen for the micro-organisms. Needless to say, all of these typical units require power consumption that adds to the overall operational expense of the plant.

In addition, it is not uncommon for a cake or crust of solids, known as scum, to form at the top of the clarifier. As this impairs the plant efficiency, frequent attention by operating personnel is necessary in order to detect and break up any accumulation of floatables in the clarifier and maintain continuous operation of the plant. Likewise, foaming at the liquid surface of the aerator may impede performance by blocking the incoming sewage and inhibiting the action of the micro-organisms. Foaming at the surface of the clarifier may impede the proper operation of scum control devices. Therefore, supervising personnel are required to detect and remedy such conditions, as well as perform routine maintenance. Although the benefits derived by the activated sludge process justify employing supervising personnel for large scale operations, the owner of an individual residence would hardly be impressed with a plant in his back yard that would require such attention.

A primary object of this invention is to provide a sewage treatment plant, employing the activated sludge process, which is particularly adapted for small scale sewage disposal. Although the plant utilizes many of the basic principles of the activated sludge process, this invention eliminates the operational drawbacks heretofore associated with treatment plants and, at the same time, efficiently converts organic wastes into oxidation end products which may be safely discharged to the environment without contributing to air, soil or water pollution. In addition, an improved activated sludge process, utilizing recirculation rates much higher than heretofore thought practical, cumulatively aids the structure to achieve increased plant longevity and efficiency.

Another object of the invention is to provide a sewage treatment plant requiring no supervising personnel and operated on nominal power consumption. The structure is of rugged and durable construction to function trouble free and to efficiently carry out a process which characteristically has been troublesome.

Another object of the invention is to provide a sewage treatment plant including an aerator, clarifier, and a unique airlift arrangement which induces skimmer flow and sludge return flow from the clarifier to the aerator. In addition to eliminating the previous need for recycle pumps, the airlift arrangement provides a further advantage in that all air which is employed for inducing recycle flow is ultimately discharged to the aerator for vigorously circulating the mixture therein and for supplying oxygen for aerobic micro-organisms.

Yet another object of the invention is to provide a sewage treatment plant in which the passage of solids to the clarifier is minimized and the sludge blanket within the bottom of the clarifier is constantly disturbed to prevent sludge compacting. Such is accomplished by optimally locating one or more conduits interconnecting the aerator and clarifier.

An additional object of the invention is to provide a sewage treatment plant having means for so controlling the discharge of effluent so that the possibility of solids being discharged with the liquid product from the plant is largely eliminated and thus, there is virtually no chance of clogging.

A further object of the invention is to provide a sewage treatment plant in which the skimmer is continuously operated even though no product is being discharged through the effluent line. This arrangement insures continuous skimming operations to prevent the buildup of scum or floating solids at the clarifier surface.

A further object of the invention is to provide a sewage treatment plant of the character described in which a surface flow pattern is established in the surface liquid of the clarifier to improve skimming performance; additionally,, solids are prevented from blocking the skimmer intake by an automatic device having a self cleaning blade and foam is prevented from vapor locking the skimmer by a gas delivery connection.

Yet a further object of the invention is to provide a clarifier of the character described which can be easily installed for use with an existing septic tank to employ the highly efficient activated sludge process.

Other and further objects, together with the features of novelty appurtenant thereto, will appear in the course of the following description.

DESCRIPTION OF THE DRAWINGS

In the accompanying drawings, which form a part of the specification and are to be read in conjunction therewith, and in which like reference numerals are employed to indicate like parts of the various views:

FIG. 2 is a fragmentary sectional view taken along line 2—2 of FIG. 1 in the direction of the arrows;

FIG. 3 is a sectional view of portions of the clarifier taken along line 3—3 of FIG. 1 in the direction of the arrows; and FIG. 4 is an enlarged schematic view illustrating the relationship between the upper portions of the skimmer and effluent pipes.

Figure 1:
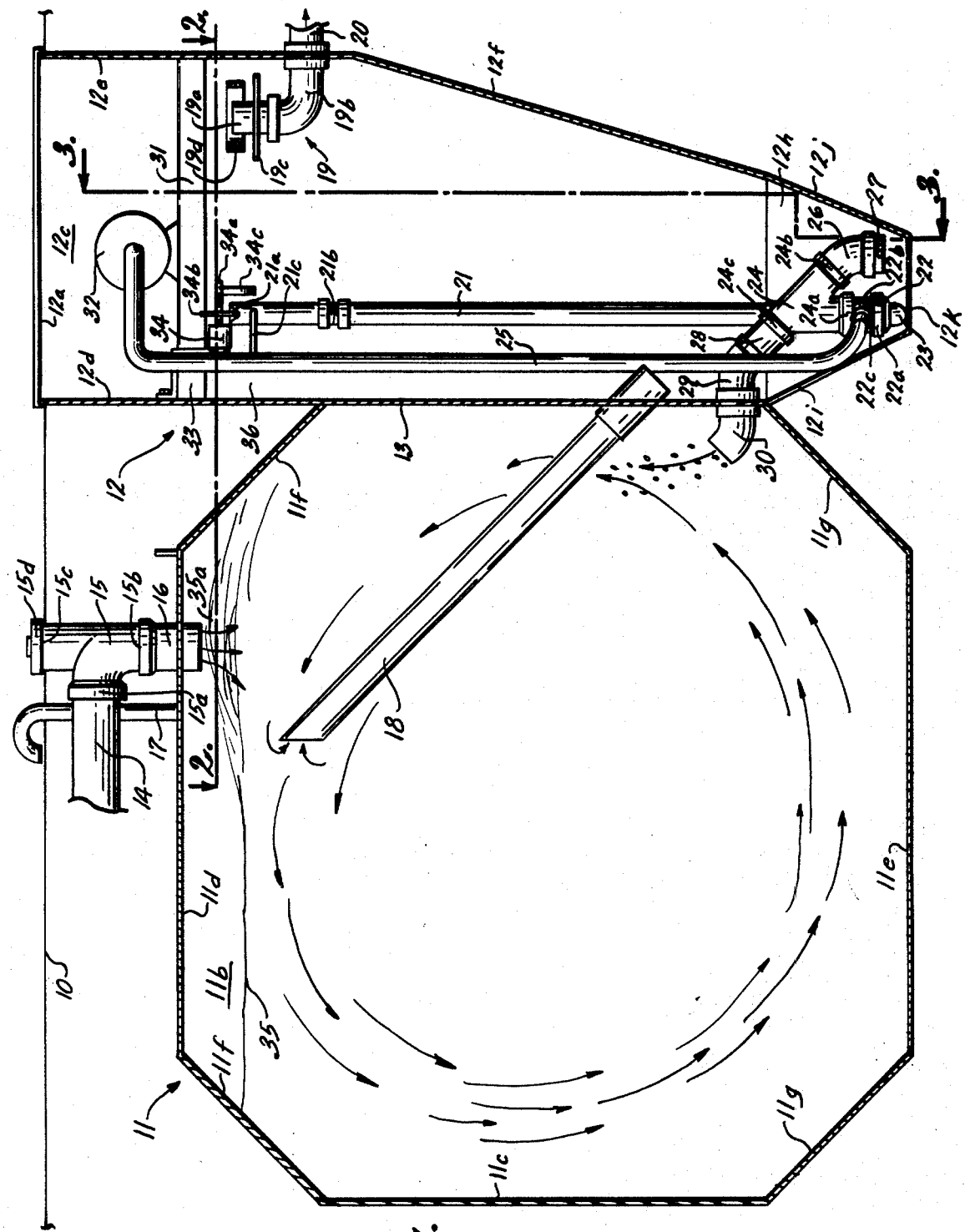
FIG. 1 is a sectional view taken on a vertical plane through a preferred embodiment of a sewage treatment plant according to the invention.

Referring more particularly to the drawings, a complete sewage treatment plant constructed in accordance with a preferred embodiment of the invention is shown installed beneath the ground level 10. As will subsequently be described in greater detail, the plant includes an aerator 11 to the left in FIG. 1 and a clarifier 12 to the right in FIG. 1 which are separated by a common wall or partition 13.

The aerator tank 11 is formed by a front side wall 11a and a rear side wall 11b, both of which are substantially flat and in the shape of an irregular octagon. A vertical end 11c and the common partition 13 are joined to the side walls 11a and 11b, as are the top and bottom walls, designated respectively by numerals 11d and 11e. Upper sloped wall members 11f and lower sloped wall members 11g interconnect the top and bottom walls 11d and 11e, vertical end wall 11e, common partition 13 and side walls 11a and 11b to complete the tank structure of the aerator 11.

A sewage inlet line 14, a portion of which is shown, leads from the conventional plumbing system of the residence or other source and is journaled to the horizontal leg 15a of a single sweep tee-coupling 15 above the top wall 11d of the aerator 11. The lower end 15b of the coupling 15 is joined to a pipe stub 16 which extends through the top wall 11d of the aerator for delivering raw sewage thereto. The upper end 15c of the tee-coupling 15 extends above the ground level 10 and is covered by a removable cap 15d which serves as a sampling point from which content specimens of the aerator 11 can be withdrawn and analyzed. Also connected to the top wall 11d of the aerator and extending above the ground level 10 is a vent pipe 17. Optionally, in many situations the treatment plant can be vented back through the conventional plumbing system and the vent pipe 17 would not be required.

Overall, the clarifier tank 12 is irregular in shape. The upper portion is generally box-like and extends to the ground level 10, being covered by a lid 12a that provides access to the interior of the clarifier 12. This upper section includes vertical front and rear side walls 12b and 12c and vertical end walls 12d and 12e. The side wall 12d adjacent the aerator is an upward extension of the common partition 13 between the aerator 11 and clarifier 12. The intermediate section of the clarifier 12 includes vertical front and rear side walls 12b and 12c, the common partition 13, and an inwardly sloped end wall 12f. The lower portion of the clarifier 12 is hopper shaped, including inwardly sloped front and rear walls 12g and 12h, inwardly sloped end walls 12i and 12j, and a bottom wall 12k substantially parallel with the bottom wall 11e of the aerator. It should be understood that the previously mentioned walls are integrally formed or joined in order to provide a tank structure.

Interconnecting the aerator 11 and the clarifier 12 are a pair of tubular conduits 18 to permit mixture passage from the aerator to the clarifier. Each conduit 18 is angularly disposed through the common partition 13 and extends upwardly at an angle into the aerator 11.

Disposed within the upper portion of the clarifier 12 is a pipe stub 19a connected to a 90°-elbow coupling 19b which serves as an effluent line 19 for discharging treated liquid from the plant. The effluent line 19 is connected through a vertical end wall 12e to an exterior discharge line 20, a portion of which is shown. In turn, the discharge line 20 may be connected to laterals, a lawn watering system, or other conventional disposal facilities.

Vertically oriented within the clarifier 12 is a standpipe or skimmer 21 of which the lower end thereof is connected to the end 22a of a single sweep tee 22 through a U-coupling 23. The top 22b of the tee 22 is in turn connected to the lower vertical end 24a of a 45° lateral 24. The substantially horizontal leg 22c of the vertical tee 22 is coupled to a compressed air line 25 disposed within the clarifier 12.

The lower angled end 24b of the 45° lateral 24 is coupled to a downwardly turned 45° elbow 26 which, in turn, is joined to an extension stub 27 to provide an intake port for sludge to be recycled to the aerator 11. The upper angled end 24c of the 45° lateral 24 is connected, through an extension 28, to a 45° elbow 29 which, in turn, is connected through the common partition 13 to an upwardly turned 45° elbow 30 disposed within the aerator 11. Optionally, a 90° elbow or an elbow plus a spool piece may be used in lieu of a 45° elbow 30 in order to increase the airlift efficiency.

In the upper section of the clarifier 12 is a shelf 31 mounted on rear wall 12c between end walls 12d and 12e. The shelf 31 supports an air compressor 32 which is connected to the air line 25. Suitable electrical connections (not shown) may also be mounted within the clarifier for supplying power to the compressor 32.

As viewed in FIG. 4, the pipe stub 19a of the effluent line 19 is fitted with a circular collar 19c. A cylindrical scum baffle 19d is mounted on the upper end of the stub 19a. In longitudinal dimensions, the baffle 19d extends above and below the upper end of the stub 19a. In radial dimensions, the baffle 19d is of greater diameter than the stub 19a to provide an annulus therebetween, but is of smaller diameter than the collar 19c.

The skimmer 21 includes an elongate slot 21a in the upper end thereof. As illustrated in FIG. 4, the upper end of the skimmer 21 extends above the upper end of the effluent stub 19a and the slot 21a extends below the upper end of the stub 19a of the effluent line. This relationship is apparent from the broken, horizontal reference line labeled R and is of primary importance in order to effect proper skimming during periods of low flow or loading of the plant. Since the intake edge (lower end of slot 21a) of the skimmer 21 is below the intake edge (the circumferential lip of stub 19a) of the effluent line 19, continuous skimming is created even though no treated product is being discharged from the clarifier 12. In this connection, the skimmer 21 is equipped with an adjustable extension 21b so that the proper height of the skimmer 21 with respect to the effluent line 19 can be easily achieved during installation of the plant.

The skimmer 21 is also equipped with a defoamer line 21c which is connected to the air line 25 and has a discharge end disposed beneath the slot 21a and above the liquid level in the skimmer.

Within the upper section of the clarifier 12, and mounted on the end wall 12d, is a bracket 33 which carries a motor 34 having an extended output shaft 34a. A clean out arm 34b is mounted on the shaft 34a to rotate through the slot 21a in the skimmer 21. Also mounted on the shaft 34a to rotate alongside the skimmer 21 is a paddle 34c. The arm 34b is used to clean out the slot 21a and to break up any floatable solids which may become lodged in the slot 21a. The paddle 34c is employed to create a slight current past the slot 21a to prevent floatables from lodging in same and to create an elliptical flow pattern to the liquid surface in the clarifier 12. The arm 34b is S-shaped to provide a self-cleaning or wiping effect when coming out of the liquid mixture and to prevent catching on the skimmer 21 as it passes through the slot 21a. The paddle 34c is optionally S-shaped to provide a self-cleaning effect as the blades come out of the liquor.

In order to better understand the unique advantages achieved by the treatment plant constructed in accordance with these principles, the following typical operational procedure is provided.

Assuming that the plant is in operation, the liquid level within the aerator 11 will be approximately as indicated in FIG. 1 by the numeral 35. The recycled material and compressed air from the clarifier 12 is discharged to the aerator 11 through the 45° elbow 30 and the rapidly rising bubbles of air induce a generally circular flow pattern as indicated by the arrows. The octagonal shape of the aerator 11 also aids in maintaining the circular flow pattern. The liquid surface 35a above the return elbow 30 is a region of great turbulence and the influent line 16 is located above this region so that incoming sewage will not be blocked by foaming and will be carried into the circulation pattern in the aerator 11.

It should be noted that the intake end of the conduits 18 are located near the periphery of the circulation pattern. As the mixture circulates, the small, light solids tend to stay toward the center of the circulation pattern, while the larger particles are thrown to the outside of the pattern and have sufficient momentum to be propelled past the intake of the conduits 18. Therefore, liquid flowing through the conduits 18 to the clarifier 12 contains only solids which have been classified as to size.

Because some solids do enter the clarifier 12, it is necessary to establish a general state of quiescence for the sludge mixture in which the solids tend to settle to the bottom, thus leaving clear liquid in the upper region of the clarifier 12. In this connection, many clarifiers found in the prior art employ a hopper shaped tank instead of the intermediate section provided herein by the front and rear side walls 12b and 12c, partition 13, and sloped end wall 12f. However, it has been found that a hopper shaped design, with all four sides inwardly converging, causes a high degree of solids compacting, which often results in clogged pumps and similar malfunctions. For this reason, the intermediate section herein is designed with only one inwardly sloped wall 12f to substantially reduce the compacting phenomenon, and only the lower section is hopper shaped to funnel the sludge to the return port 27. The discharge end of the conduits 18 are directed toward the lower end of the intermediate section and to the hopper shaped lower section of the clarifier 12 in order to disturb the accumulation of solids (known as the sludge blanket), and to further prevent compacting of solids.

Not all solids, however, tend to settle to the bottom of the clarifier 12. Some solids, referred to as floatables, tend to migrate to the top of the clarifier 12. Since it is desirable to prevent such floatables from being discharged in the effluent stream, the collar 19c and scum baffle 19d are fitted to the effluent line 19. As previously mentioned, the collar 19c is of larger diameter than the scum baffle 19d so that floatables when migrating to the surface 36 will strike the under side of the collar 19c and, when rising past the collar 19c, will be on the outside of the scum baffle 19d. Likewise, floatables at the surface 36 will be held away from the effluent line 19 by the baffle 19d. It should be understood, however, that other structural configurations can provide the submerged baffle achieved by collar 19c and the surface baffle achieved by baffle 19d.

In order to prevent the formation of scum on the clarifier surface 36, it is necessary to return all floatable materials back to the aerator 11 for further decomposition. The skimmer 21 achieves this purpose and the clean out arm 34b continuously rotates through the slot 21a to break up solids and prevent clogging. The paddle 34c also aids in this objective by creating a surface current past the slot 21a and also by establishing a surface flow pattern for the clarifier surface 36 to keep the floatables moving and to prevent accumulation around the skimmer 21. As shown in FIG. 2, the effluent line 19 is located in one corner of the clarifier 12 so as not to unduly disturb this surface flow pattern created by the paddle 34c.

Foam or gas bubbles may occur on the clarifier surface under some process conditions and cause "vapor locking" of the skimmer 21. The defoamer 21c has its discharge end disposed beneath the slot 21c and above the liquid surface in the skimmer whereby air delivered through the defoamer knocks down and prevents accumulation of foam in the line.

Compressed air supplied by the compressor 32 through the line 25 induces or creates all major circulation within the plant. When delivered to the previously described piping arrangement disposed within the bottom of the clarifier 12, the compressed air provides two separate air lift functions. First, the air is delivered to the tee-coupling 22 and creates an air lift to pull mixture through the skimmer pipe 21. With the air imparting velocity to the skimmer material, the air and mixture then surge through the lateral 24 to create a second air lift which pulls sludge through the return port 27. The dispersed air, skimmer mixture, and sludge then flow through the extension 28, elbow 29, and discharge to the aerator 11 through the elbow 30. The force with which the recycled mixture is discharged to the aerator 11 further causes the air to be dispersed throughout the mixture and creates the circular flow pattern within the aerator 11.

Since both the aerator 11 and clarifier 12 are essentially at atmospheric conditions, the liquid levels 35 and 36 in each tank are approximately the same height. Thus, when material is recycled from the clarifier 12, which would tend to drop the liquid level 36 within the clarifier and raise the liquid level 35 within the aerator, the hydraulic liquid head in the aerator 11 forces material to flow back to the clarifier 12 through the conduits 18 to establish equilibrium. The plant, therefore, is operated at substantially steady state equilibrium conditions although the input of raw sewage through line 14 is intermittent. Incoming sewage causes a like amount of treated product to be discharged through the effluent line 19.

We have discovered that operation and efficiency of the activated sludge process is greatly enhanced if the recirculation between the clarifier 12 and aerator 11 is boosted to rates substantially higher than were heretofore thought feasible. Plants employing this process normally use between 50 to 200 percent recirculation rate. Such a designation is known to those in this field as being a daily rate based on aerator volume and can be calculated from the following equation:

Recirculation Rate Per cent = $144,000(R/V)$ where $R$ represents the recycle rate in gallons per minute and $V$ represents the aerator volume in gallons. On this basis, we have found improved results by using a recirculation rate above 1,000 percent. A preferred range of rates is 2,000 to 5,000 percent. Using a recycle rate of 16.7 gpm and an aerator volume of 600 gallons, the above equation indicates a rate of approximately 4,000 percent in the preferred range.

As an illustrative example of the foregoing principles, the following discussion of the process and design criteria, adapted for a typical sewage plant to serve an individual residence, may be beneficial.

For sizing the plant, a standard rating assumes that the residence includes six persons each discharging 100 gallons per day of waste materials to the plant containing 0.25 pounds $BOD_5$ per person per day. $BOD_5$ is the abbreviation for 5-day biochemical oxygen demand, a standardized test for sewage strength based upon the quantity of oxygen required for the biological oxidation of the organic matter contained therein.

On this basis, the aerator is sized for a 600 gallon capacity and the clarifier is sized for a 180 gallon capacity which provides a 24 hour hold-up time in the aerator and a 6 hour hold-up time in the clarifier to achieve a total detention time of material within the plant of 30 hours at design loading.

At standard operating conditions, the compressor is sized to deliver 9 cubic feet per minute of air which represents in excess of 2 pounds of dissolved oxygen per day. This air flow induces a 4,000 percent recirculation rate which, as previously mentioned, is within the preferred range of our improved activated sludge process.

Structurally, the tanks are fabricated from 12 gauge steel which is coated with suitable resin to prevent corrosion. The influent line is typically 4 inch pipe and the effluent line is 2 inch pipe. For typical internal piping, the tubular conduits 18 are 2 ½ inches, the air line 25 is three-fourths inch, the skimmer 21 is 1 ½ inches, and the sludge return and remaining piping is 2 inches.

That which has been previously described is a preferred embodiment of the invention. However, we are fully aware that some, in view of the large number of septic tanks currently in use, may desire to have a more effective sewage plant to fight the pollution problem, but may find it unfeasible to scrap their existing septic tank. In many such situations, it is entirely feasible to employ the existing septic tank in lieu of the aerator described herein and to install, with minor modifications to the septic tank, the clarifier 12 as described. In addition to physically installing the clarifier, the modifications to the septic tank would include installing the conduits 18 and also providing fittings such as the discharge elbow 30. In this manner, the existing septic tank which previously employed the anaerobic process, can be converted to the more efficient activated sludge process.

Likewise, some septic tanks of sufficient capacity may be modified to serve as both the aerator and the clarifier. For this type of modification, it would be necessary to partition the existing septic tank to provide two separate chambers, as well as install the piping and air supply system as previously described.

From the forgoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. A sewage treatment plant comprising:

a. a first chamber suitable for containing a mixture that comprises waste solids and liquids;
b. an influent line for delivering raw sewage to said first chamber;
c. a second chamber suitable for containing said mixture;
d. a conduit interconnecting said first and second chambers to permit mixture flow therebetween;
e. an effluent line connected to said second chamber for discharging treated liquid therefrom;
f. a first recycle line interconnecting said first and second chambers and having an intake end disposed near the bottom of said second chamber for returning mixture to said first chamber;
g. a second recycle line interconnecting said first and second chambers and having an intake edge disposed near the surface of the mixture within said second chamber for returning same to said first chamber; and
h. a compressed gas line connected to said second recycle line to establish a first gas lift therein with the discharge thereof connected to said first recycle line to establish a second gas lift therein with the discharge thereof connected to said first chamber whereby: (1) to induce mixture flow through said first and second recycle lines from said second chamber to said first chamber; (2) to induce mixture flow through said conduit from said first chamber to said second chamber; (3) to introduce and disperse oxygen-containing gas into said mixture in said first chamber; and (4) to agitate and circulate said mixture in said first chamber; and
i. means to compress gas above atmospheric pressure connected to said compressed gas line.

2. The sewage treatment plant as in claim 1, said effluent line including an intake edge disposed near the surface of the mixture in said second chamber, a surface baffle disposed outwardly from said intake edge to define a flow passage therebetween and to block solids on the mixture surface from passing to said intake edge, and a submerged baffle disposed beneath the flow passage between said intake edge and surface baffle to prevent solids rising to the mixture surface from passing to said flow passage.

3. The sewage treatment plant as in claim 1, including a gas delivery line connected to said second recycle line beneath said intake edge for delivering gas thereto to prevent the accumulation of foam in said second recycle line.

4. The sewage treatment plant as in claim 1, said conduit interconnecting said first and second chambers to permit mixture flow therebetween comprising an angularly disposed, straight pipe projecting upwardly into said first chamber and having an intake port disposed near the upper periphery of the flow pattern of the mixture in said first chamber whereby solids passing through said pipe to said second chamber are classified as to size.

5. The sewage treatment plant as in claim 1, including a continuously operated flow circulation paddle mounted within said second chamber and operable to rotate past the intake edge of said second recycle line for moving waste solids away from said intake edge and for creating a generally circular flow pattern on the surface of the mixture in said second chamber, and a continuously operated cleaning arm mounted within said second chamber and operable to rotate adjacent the intake edge of said second recycle line for breaking up waste solids blocking said intake edge in order to prevent clogging of said second recycle line.

* * * * *